Patented Nov. 28, 1933

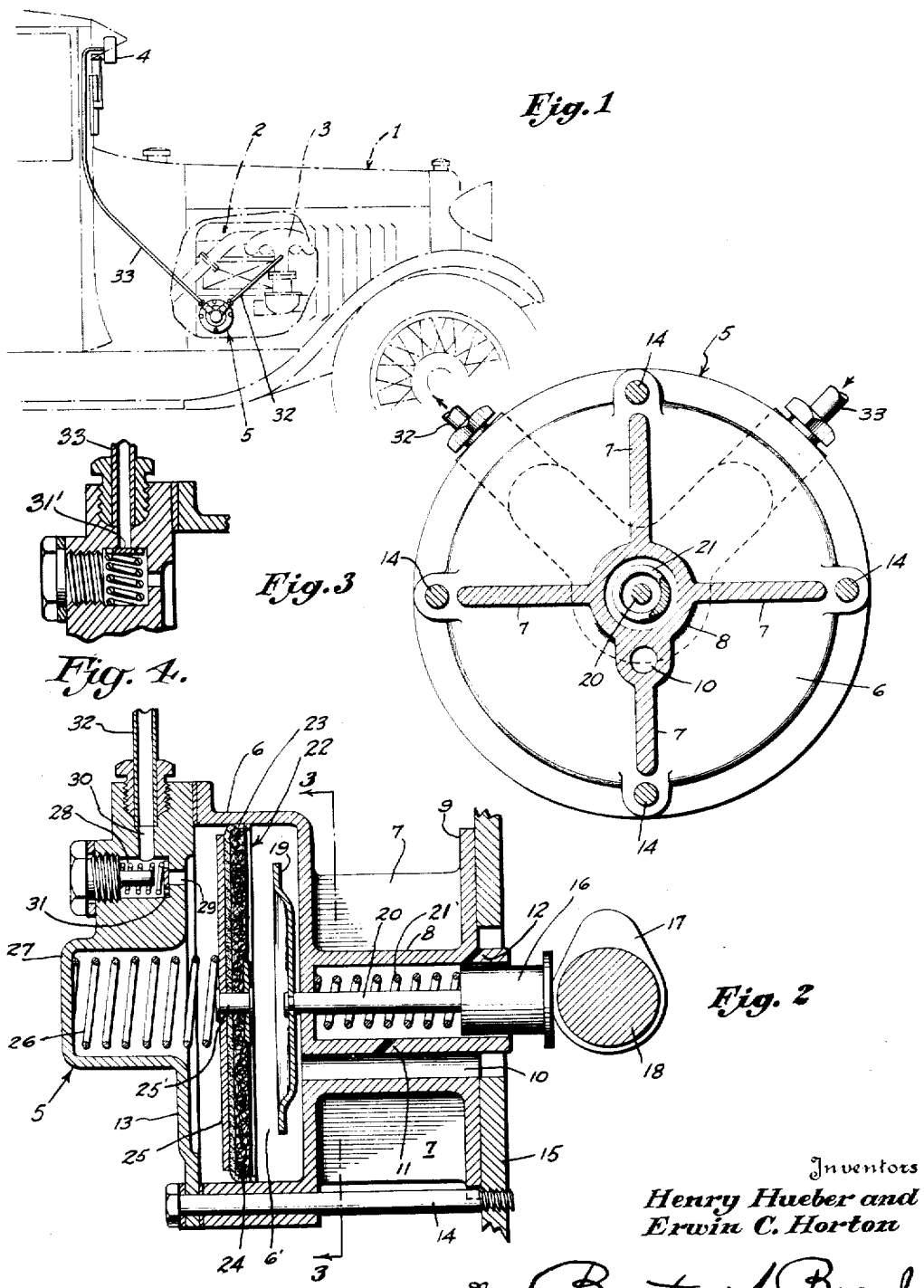

1,937,150

UNITED STATES PATENT OFFICE

1,937,150

SUCTION PUMP

Henry Hueber, Buffalo, and Erwin C. Horton, Hamburg, N. Y., assignors to Trico Products Corporation of Buffalo, N. Y.

Application April 3, 1930. Serial No. 441,293

7 Claims. (Cl. 230—38)

The present invention relates to suction pumps, and more particularly, to an auxiliary pump for sustaining the negative pressure, or vacuum, created in the intake manifold of internal combustion engines for actuating automobile accessories which are suction operated.

Automobile accessories which are operated by differential pressure motors, or suction motors, and which obtain the desired suction from the intake manifold of the internal combustion engine of the automobile must, of necessity, fluctuate in their operable speed as the suction in the intake manifold varies. The degree of suction, or vacuum, obtaining within the intake manifold of the internal combustion engine, depends to a great extent upon the position of the throttle and decreases with an increased opening of the throttle. As a result, during periods of acceleration or during periods of very high engine speed, two conditions under which the throttle is opened wide, the suction in the intake manifold is materially less than that required to actuate the particular suction operable automobile accessory at the desired rate. It has, therefore, been found advantageous to sustain the suction obtained from the intake manifold of the said internal combustion engine by providing auxiliary suction sustaining devices.

The instant invention is designed to provide an auxiliary pumping device for sustaining the suction obtained from the intake manifold whereby suction operated automobile accessories are maintained in operation at a desired and constant speed. The device is adapted for attachment to automobiles presently in use without interfering with the efficient operation of the same and may derive its motive power from a camming portion of the engine of the automobile to which it is attached. The instant invention further has for an object to provide means which in nowise interferes with the efficient operation of the suction operated automobile accessories under those conditions wherein the suction obtaining within the intake manifold is wholly sufficient for such operation, (the device acting as an idling mechanism during such periods); but under those conditions wherein the suction obtaining within the intake manifold of the internal combustion engine is found insufficient for efficient operation of the said automobile accessories, said means will come into play and act to sustain and maintain the desired degree of suction.

In the drawing:

Fig. 1 is a portion of an automobile in phantom, partially broken away, showing the instant invention attached to the engine of the said automobile.

Fig. 2 is a view, in section, of the device.

Fig. 3 is a view taken on line 3—3 of Fig. 2.

Fig. 4 is a fragmentary view, in section, of the inlet valve and connecting conduit.

Referring more particularly to the drawing, an automobile 1 is provided with an internal combustion engine 2, an intake manifold 3, a suction operated accessory 4 (such as a windshield cleaner), and a suction sustaining device 5.

The suction sustaining device 5, as depicted herein, consists of a housing or cylinder 6 which may be suitably mounted although a simple mounting may be provided by web frame elements 7 extending from a base plate or flange 9 and surrounding the cylindrical guide portion 8, the latter opening through the base 9. A passage 10 is formed within one of the web members 7 whereby fluid communication may be maintained between the crank case which mounts the member 9 and the chamber portion 6' of the housing 6. Fluid communication between the guide 8 and passageway 10 is provided by the passage 11, and a similar passage 12 permits of fluid communication between the guide 8 and the crank case 15. Oil, therefore, splashing in the crank case will enter passage 12, for lubricating the sliding bearing surface of a tappet 16, and will pass on through passage 11 into the chamber 6'.

A head 13 adapted to fit upon the housing 6 is attached to the said housing, and bolts 14 are passed through the head and said housing and anchored to the crank case for mounting the device 5. Reciprocatory motion is imparted to the tappet 16 by a cam 17 on the engine cam shaft 18, causing a similar reciprocation of a pusher disk or drive member 19 which is supported within the chamber 6' by a rod 20 extending through the housing 6 and axially through the cylindrical portion 8 and, in turn, connected to the tappet 16. A coil following spring 21 surrounds the pusher rod 20 and is compressed between the tappet 16 and the inner end of the guide 8, insuring a following contact of the head 16 with the cam 17.

A piston 22 is freely slidable in the chamber 6' and is herein depicted as consisting of a cup packing 23, a felt dampening pad 24 within the cup, and a supporting plate 25 secured together as by a rivet 25' and serving to make fluid tight contact with the wall portions of the chamber 6'. A coiled power spring 26 is placed within an axially disposed well or chamber 27 formed in the facing plate or head 13 and is adapted to urge the piston 22 in one direction of movement and toward the pushing disk 19. The disk therefore serves to maintain the freely mounted piston in its proper position within the cylinder and against canting. Fluid communication being maintained between the interior portions of the housing 6 and the crank case of the automobile engine by means of the passageway 10 and the passages 11 and 12, lubrication of the piston 22, the pusher rod 20 and the tappet 16 is thereby maintained, oil from the crank case of the automobile engine entering the passage 12 or the passage 10 and finding its way to the well in the housing 6, thus eliminating all tendency of the piston packing drying out and subsequently deteriorating.

A valve chamber 28 within the head 13 has fluid communication with the chamber 6' by means of the port 29, and by means of port 30 to the intake manifold 3 through the conduit 32. A suitable type of check valve 31 is placed within the chamber 28 for directing the flow of fluid from the chamber 6' to the valve chamber 28 and into the conduit 32.

A similar type of check valve 31', serving as an inlet valve, is positioned within the inlet conduit 33 which is suitably connected to the particular automobile accessory which is to be operated by negative pressure or suction, such as the windshield cleaner 4.

In operation of the device, under substantially constant engine speed, a difference in pressure between the atmospheric pressure and the pressure obtaining within the intake manifold exists. Under the influence of this differential pressure, atmospheric fluid enters the intake of the suction operated accessory and flows through the conduit 33 into the chamber 6' and thence onward, into the intake manifold 3. When the fluid pressure between the piston 22 and the face plate 13 is normally less than atmospheric pressure, and fluid pressure obtaining upon the opposite side of the said piston being substantially the same as atmospheric pressure, the said piston will be urged toward the face plate 13, or out of the path or stroke of the drive member 19.

As mentioned hereinabove, under engine operating conditions which necessitate a wide throttle, that is, during acceleration of the said engine or at high speed thereof, increased quantities of air are permitted to enter the intake manifold, and thereby decrease the differential pressure therein. When the suction within the intake manifold in the internal combustion engine decreases beyond a certain value, the spring 26 urges the piston away from the face plate and toward and into the path of the pusher disk 19.

The reciprocating action of the said pusher disk is maintained at all times during the operation of the engine of the automobile, and increases in frequency with the increase in speed of said engine. In consequence whereof, an increase in the pumping action of the packing is provided under those conditions where the throttle is opened wide. There results therefore, a reciprocating action of the piston toward and from the face plate 13 whereby fluid is caused to enter the chamber 6' from the conduit 33 and to be expelled therefrom by the valve 31 and into the manifold 3.

The piston, being responsive to manifold influences, will, therefore, have a movement independently of its drive 19 and when the piston is spaced from the drive but not entirely clear therefrom, the impacts between the piston and its drive will be cushioned and silenced by the felt 24. The drive member is held in constant connection with the cam 17 by the spring 20. Obviously, the parts will be well lubricated by oil from the crank case and a small quantity may accumulate within the chamber 6'.

What is claimed is:

1. A suction pump for motor vehicle accessories comprising a cylinder having valved inlet and outlet ports, a piston freely reciprocatory in the cylinder, means urging the piston in one direction of movement, said cylinder having a passage to the motor of the vehicle making free fluid communication with said cylinder and with the motor of the vehicle, said cylinder provided with a guide portion having fluid communication with the crank case of the motor of the vehicle and said cylinder passage, and an actuating rod in said guide portion for engagement with a movable part of the motor of the vehicle for actuating said rod toward and from said piston.

2. A pump for fluid pressure operated accessory systems of motor vehicles, comprising a casing having a valved inlet port and a valved outlet port, a fluid displacing member in the casing movable back and forth to take in and expel fluid unidirectionally through the ports, resilient means for urging said member on one stroke and counteractable by a predetermined pressure in the casing, said member being movable against the urge of said resilient means by such predetermined pressure, said casing having a bearing, pusher means mounted in said casing bearing and having a follower part adapted for actuation by a moving part of the motor vehicle engine, said pusher means having another part with a path of movement into which path said fluid displacing member is urged by said resilient means for being actuated thereby, a cushioning pad, means overhanging the cushioning pad and securing the latter on the fluid displacing member, a portion of the pad being exposed for receiving the driving impact from said second pusher part whereby the force and noise of the impact are cushioned and dampened, and means for mounting the casing.

3. A pump for fluid pressure operated accessory systems of motor vehicles, comprising a casing having a valved inlet port and a valved outlet port, a fluid displacing member in the casing movable back and forth, to intake and expel fluid unidirectionally through the ports, resilient means for urging said member on one stroke and counteractable by a predetermined pressure in the casing, said member being movable against the urge of said resilient means by such predetermined pressure, said casing having a bearing, pusher means mounted on said casing bearing and having a follower part adapted for actuation by a moving part of the motor vehicle engine, said pusher means having another part with a path of movement into which path said fluid displacing member is urged by said resilient means for being actuated thereby, said fluid displacing member having a face adapted to be engaged by said second pusher part for being actuated thereby, a cushioning pad carried by the face of said fluid displacing member to be engaged by said second pusher part, and means tending to urge the second pusher part away from the cushioning pad.

4. A suction pump for motor vehicle acessories comprising a casing having valved inlet and outlet ports, a fluid displacing member movable back and forth in the casing, means urging the member in one direction of movement, said member being movable in response to a predetermined pressure and against the urge of said means, and a drive member for urging the first member in the opposite direction, carried by the casing and comprising a plate-like member in said casing for broad flat engagement with the first member, and an actuator rod attached to the plate for engagement with a movable part of the motor of the vehicle for actuating said plate toward and from the first member, the pressure responsive movement of the first member being independent of the plate.

5. A booster pump for air operated accessory systems of motor vehicles, comprising a chamber having valved inlet and outlet ports providing for unidirectional flow through the chamber, a fluid displacing member movable back and forth in the chamber, said chamber having a wall provided with a bearing, pusher means mounted in the chamber bearing and having a path of movement independent of said fluid displacing member, means for mounting the chamber adjacent a moving part of the motor vehicle engine, said pusher means adapted for being driven from such engine part, resilient means for holding said pusher means in constant driving relation with such engine part to be constantly moved back and forth thereby, and resilient means acting to urge said fluid displacing member into the path of said pusher means to be moved by the latter against the urge of said second resilient means, said fluid displacing member being movable in response to a predetermined pressure in the chamber and against the urge of said second resilient means, such pressure responsive movement of the fluid displacing member being independent of said pusher means and during the continued back and forth movement of the latter.

6. A suction pump for air operated accessory systems of motor vehicles, comprising a casing provided with a chamber having an inlet and an outlet, fluid displacing means movable back and forth to take in and expel fluid unidirectionally through the chamber, spring means acting on the fluid displacing means to enlarge the chamber for taking fluid thereinto, said spring means being counteractable by a predetermined fluid pressure acting on the fluid displacing means and thereby holding said fluid displacing means against chamber enlarging movement, pusher means movably mounted in the casing and having a follower part adapted for actuation by a moving part of the motor vehicle engine, said pusher means having another part with a path of movement into which path said fluid displacing means is urged by said spring means for being actuated thereby, said fluid displacing means being movable independently of said pusher means, and resilient means tending to urge the pusher means away from the fluid displacing means to hold said pusher means into operative contact with such moving part of the motor vehicle engine.

7. A booster pump for air operated accessory systems of motor vehicles, comprising a casing provided with a chamber having valved inlet and outlet ports providing for unidirectional flow therethrough, a fluid displacing member movable back and forth in the chamber, spring means acting on the fluid displacing member at one side thereof to enlarge the chamber, said fluid displacing member being movable in response to a predetermined pressure and against the action of said spring means to ensmall the chamber, an actuator movably mounted in the casing at the opposite side of the fluid displacing member, and resilient means within the casing acting on the actuator to hold the outer end of the latter constantly in operative engagement with a moving part of the engine to be reciprocated thereby, the inner end of the actuator being separable from said fluid displacing member to permit independent movement of the latter and having a part adapted to contact with said fluid displacing member to move the latter against the action of said spring.

HENRY HUEBER.
ERWIN C. HORTON.

CERTIFICATE OF CORRECTION.

Patent No. 1,937,150.   November 28, 1933.

HENRY HUEBER, ET AL.

It is hereby certified that error appears in the printed specification of the above numbered patent requiring correction as follows: Page 2, line 126, claim 3, for "intake" read take in; and line 133, for "on" read in; and that the said Letters Patent should be read with these corrections therein that the same may conform to the record of the case in the Patent Office.

Signed and sealed this 23rd day of January, A. D. 1934.

F. M. Hopkins (Seal)   Acting Commissioner of Patents.

ber in one direction of movement, said member being movable in response to a predetermined pressure and against the urge of said means, and a drive member for urging the first member in the opposite direction, carried by the casing and comprising a plate-like member in said casing for broad flat engagement with the first member, and an actuator rod attached to the plate for engagement with a movable part of the motor of the vehicle for actuating said plate toward and from the first member, the pressure responsive movement of the first member being independent of the plate.

5. A booster pump for air operated accessory systems of motor vehicles, comprising a chamber having valved inlet and outlet ports providing for unidirectional flow through the chamber, a fluid displacing member movable back and forth in the chamber, said chamber having a wall provided with a bearing, pusher means mounted in the chamber bearing and having a path of movement independent of said fluid displacing member, means for mounting the chamber adjacent a moving part of the motor vehicle engine, said pusher means adapted for being driven from such engine part, resilient means for holding said pusher means in constant driving relation with such engine part to be constantly moved back and forth thereby, and resilient means acting to urge said fluid displacing member into the path of said pusher means to be moved by the latter against the urge of said second resilient means, said fluid displacing member being movable in response to a predetermined pressure in the chamber and against the urge of said second resilient means, such pressure responsive movement of the fluid displacing member being independent of said pusher means and during the continued back and forth movement of the latter.

6. A suction pump for air operated accessory systems of motor vehicles, comprising a casing provided with a chamber having an inlet and an outlet, fluid displacing means movable back and forth to take in and expel fluid unidirectionally through the chamber, spring means acting on the fluid displacing means to enlarge the chamber for taking fluid thereinto, said spring means being counteractable by a predetermined fluid pressure acting on the fluid displacing means and thereby holding said fluid displacing means against chamber enlarging movement, pusher means movably mounted in the casing and having a follower part adapted for actuation by a moving part of the motor vehicle engine, said pusher means having another part with a path of movement into which path said fluid displacing means is urged by said spring means for being actuated thereby, said fluid displacing means being movable independently of said pusher means, and resilient means tending to urge the pusher means away from the fluid displacing means to hold said pusher means into operative contact with such moving part of the motor vehicle engine.

7. A booster pump for air operated accessory systems of motor vehicles, comprising a casing provided with a chamber having valved inlet and outlet ports providing for unidirectional flow therethrough, a fluid displacing member movable back and forth in the chamber, spring means acting on the fluid displacing member at one side thereof to enlarge the chamber, said fluid displacing member being movable in response to a predetermined pressure and against the action of said spring means to ensmall the chamber, an actuator movably mounted in the casing at the opposite side of the fluid displacing member, and resilient means within the casing acting on the actuator to hold the outer end of the latter constantly in operative engagement with a moving part of the engine to be reciprocated thereby, the inner end of the actuator being separable from said fluid displacing member to permit independent movement of the latter and having a part adapted to contact with said fluid displacing member to move the latter against the action of said spring.

HENRY HUEBER.
ERWIN C. HORTON.

CERTIFICATE OF CORRECTION.

Patent No. 1,937,150.  November 28, 1933.

HENRY HUEBER, ET AL.

It is hereby certified that error appears in the printed specification of the above numbered patent requiring correction as follows: Page 2, line 126, claim 3, for "intake" read take in; and line 133, for "on" read in; and that the said Letters Patent should be read with these corrections therein that the same may conform to the record of the case in the Patent Office.

Signed and sealed this 23rd day of January, A. D. 1934.

F. M. Hopkins (Seal)  Acting Commissioner of Patents.

CERTIFICATE OF CORRECTION.

Patent No. 1,937,150.   November 28, 1933.

HENRY HUEBER, ET AL.

It is hereby certified that error appears in the printed specification of the above numbered patent requiring correction as follows: Page 2, line 126, claim 3, for "intake" read take in; and line 133, for "on" read in; and that the said Letters Patent should be read with these corrections therein that the same may conform to the record of the case in the Patent Office.

Signed and sealed this 23rd day of January, A. D. 1934.

F. M. Hopkins (Seal)   Acting Commissioner of Patents.